US012699229B2

(12) United States Patent
Bo et al.

(10) Patent No.: US 12,699,229 B2
(45) Date of Patent: *Aug. 4, 2026

(54) PRECONNECTORIZED OPTICAL DISTRIBUTION CABLE ASSEMBLIES AND CORRESPONDING METHODS OF DEPLOYMENT

(71) Applicant: CORNING RESEARCH & DEVELOPMENT CORPORATION, Corning, NY (US)

(72) Inventors: Lan Bo, Shanghai (CN); Songhua Cao, Shanghai (CN); Ke Jiang, Shanghai (CN); Xu Li, Shanghai (CN); Wei Liu, Shanghai (CN); Peiyou Xiong, Shanghai (CN); Wei Zhang, Shanghai (CN); Shun Sheng Zhou, Shanghai (CN)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 18/390,871

(22) Filed: Dec. 20, 2023

(65) Prior Publication Data

US 2024/0118498 A1     Apr. 11, 2024

Related U.S. Application Data

(63) Continuation-in-part of application No. 17/723,789, filed on Apr. 19, 2022, now Pat. No. 11,880,082.

(51) Int. Cl.
*G02B 6/38* (2006.01)

(52) U.S. Cl.
CPC .......... *G02B 6/3801* (2013.01); *G02B 6/381* (2013.01)

(58) Field of Classification Search
None
See application file for complete search history.

(56) References Cited

U.S. PATENT DOCUMENTS

| | | | |
|---|---|---|---|
| 6,466,725 B2 * | 10/2002 | Battey | G02B 6/566 |
| | | | 385/100 |
| 6,522,814 B2 | 2/2003 | Yoshida et al. | |
| 7,006,739 B2 | 2/2006 | Elkins et al. | |
| 7,346,243 B2 | 3/2008 | Cody et al. | |
| 7,495,175 B2 | 2/2009 | Pluister | |
| 7,588,216 B1 | 9/2009 | Hoyl et al. | |
| 10,371,917 B2 | 8/2019 | Cooke et al. | |
| 11,209,604 B2 | 12/2021 | Yokokawa et al. | |

(Continued)

FOREIGN PATENT DOCUMENTS

| | | |
|---|---|---|
| CN | 101887153 A | 11/2010 |
| CN | 201749240 U | 2/2011 |

(Continued)

OTHER PUBLICATIONS

European Patent Application No. 22170279.8, Extended European Search Report dated Oct. 25, 2022; 9 pages; European Patent Office.

*Primary Examiner* — Jerry Rahll
(74) *Attorney, Agent, or Firm* — Adam R. Weeks

(57) ABSTRACT

The present disclosure relates to a distribution cable assembly that has various features to enable flexible configurations to accommodate various data center configurations.

15 Claims, 14 Drawing Sheets

(56)                    References Cited

U.S. PATENT DOCUMENTS

| | | | | |
|---|---|---|---|---|
| 11,880,082 | B2 * | 1/2024 | Cao | G02B 6/4475 |
| 2004/0062496 | A1 | 4/2004 | Shuman et al. | |
| 2006/0093278 | A1 | 5/2006 | Elkins et al. | |
| 2008/0080818 | A1 | 4/2008 | Cobb et al. | |
| 2008/0181570 | A1 | 7/2008 | Mullaney | |
| 2010/0150504 | A1 | 6/2010 | Allen et al. | |
| 2016/0103290 | A1 * | 4/2016 | Loeffelholz | G02B 6/4475 |
| | | | | 385/100 |
| 2020/0341220 | A1 | 10/2020 | Yokokawa et al. | |

FOREIGN PATENT DOCUMENTS

| | | | |
|---|---|---|---|
| CN | 103792631 | A | 5/2014 |
| CN | 204010746 | U | 12/2014 |
| CN | 104898242 | A | 9/2015 |
| CN | 216160878 | U | 4/2022 |
| CN | 216285886 | U | 4/2022 |
| EP | 0038861 | A1 | 11/1981 |
| JP | 63-173008 | A | 7/1988 |
| JP | 2000-258672 | A | 9/2000 |
| JP | 2001-116968 | A | 4/2001 |
| JP | 3156316 | U | 12/2009 |
| WO | 2000/065610 | A1 | 11/2000 |
| WO | 2008/120623 | A1 | 10/2008 |
| WO | 2020/214762 | A1 | 10/2020 |

* cited by examiner

350

322

320

331

343　200

341

345　335

333

204

350

200

322

320

333

331

347

343

327

347

341

329　351　353

329A

204

332

330

200

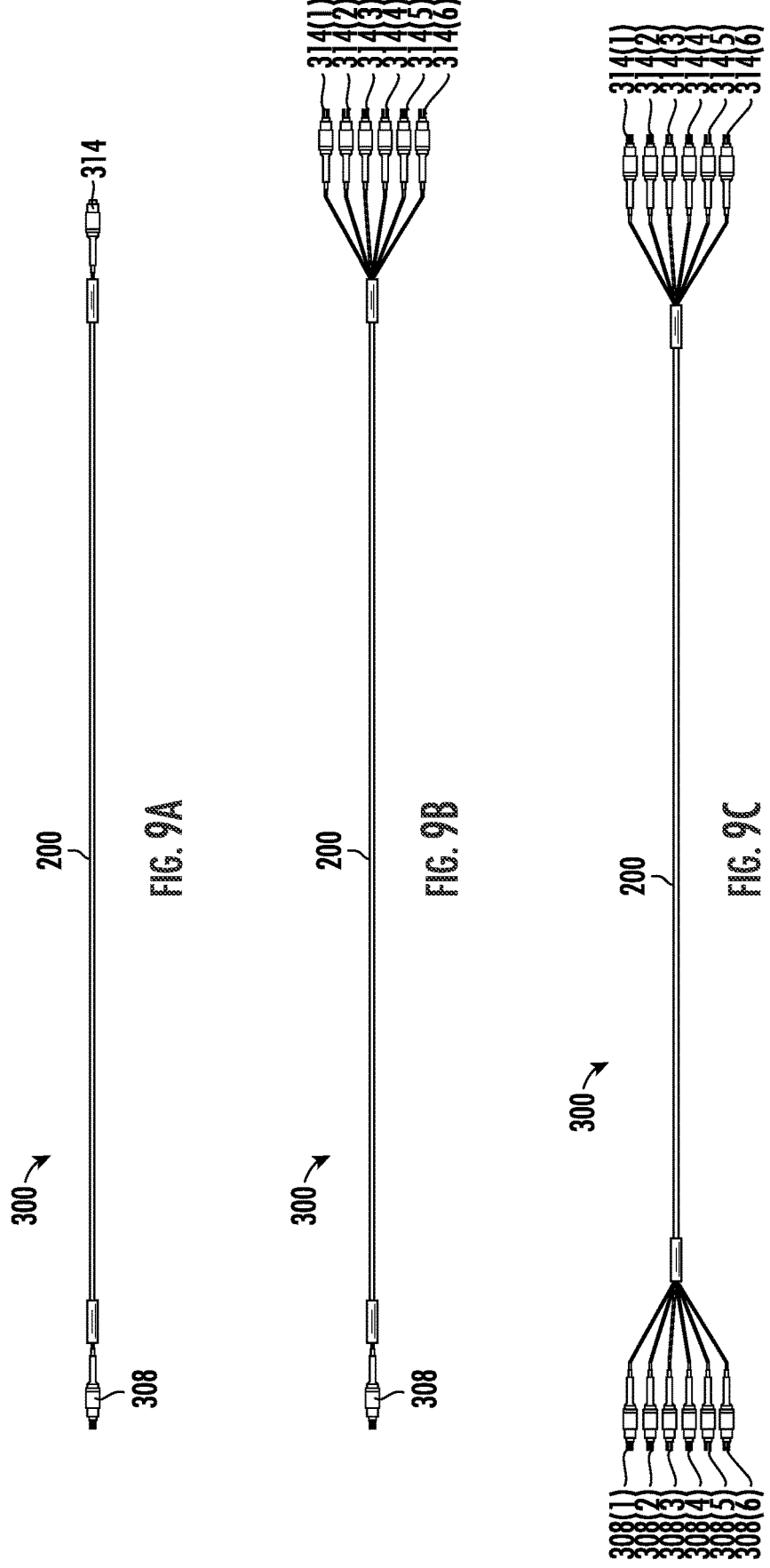

PRECONNECTORIZED OPTICAL DISTRIBUTION CABLE ASSEMBLIES AND CORRESPONDING METHODS OF DEPLOYMENT

PRIORITY APPLICATION

This application is a continuation-in-part of U.S. application Ser. No. 17/723,789, filed on Apr. 19, 2022, which claims the benefit of priority to International Application No. PCT/CN21/90996, filed on Apr. 29, 2021, both applications being incorporated herein by reference.

FIELD OF THE DISCLOSURE

This disclosure relates to preconnectorized optical distribution cable assemblies, and in particular, relates to preconnectorized optical distribution cable assemblies design and deployment capability.

BACKGROUND OF THE DISCLOSURE

Data center design and cabling-infrastructure architecture are increasingly large and complex, which requires incorporation of high-density optical components (e.g., optical fiber densities), such as to compensate for limited space and meet increasing performance demands. Many data centers include fiber optic cables, which have a number of advantages in waveguide systems compared to bulky traditional conductor cables (e.g., copper). Fiber optic cables provide wide bandwidth data transmission, transport multiple signals and traffic types, and/or deliver high-speed Internet access, especially as data rates increase. Data centers utilize multi-fiber cables to interconnect and provide signals between building distribution frames and/or to individual unit centers (e.g., computer servers). However, the labor and cost of deploying such multi-fiber cable networks for a data center can be high. Thus, there is a desire to reduce the time and costs associated with data center construction, particularly regarding cabling installation.

One way to improve optical infrastructure installation efficiency is to pre-engineer infrastructure components. Such components (e.g., fiber optic cables) may be preterminated in a factory with connectors installed, tested, and packaged for fast, easy, and safe installation at a data center. In this way, the installer merely needs to unpack the components, pull or route the preconnectorized fiber optic cable assembly, snap-in connectors, and/or install patch cords to end equipment, etc. This saves a significant amount of time, effort, and costs compared to on-site connectorization and assembly of cables.

However, data center configurations vary, and there is a need to improve upon the flexibility of the infrastructure components to accommodate different data center configurations. Stated another way, a need remains in the art to continue to improve upon installation efficiency of the infrastructure components to accommodate different data center configurations.

SUMMARY OF THE DISCLOSURE

The present disclosure relates to a distribution cable assembly that has various features to enable flexible configurations to accommodate various data center configurations.

In one embodiment, a distribution cable assembly is provided. The distribution cable assembly, comprising: a distribution cable having a distribution end and a plurality of subunit cables within the distribution cable; a plurality of tap points positioned along a length of the distribution cable, wherein the plurality of tap points are each configured to route one of the plurality of subunit cables away from a remainder of the plurality of subunit cables to form a respective tap cable and the plurality of tap points are spaced apart in a first configuration; wherein the plurality of tap points are adjustable such that the plurality of tap points are spaced apart in a second configuration that is different than the first configuration.

In another embodiment, a distribution cable assembly comprises: a distribution cable having a distribution end and a plurality of subunit cables within the distribution cable; and a plurality of tap points positioned along a length of the distribution cable in a first configuration. Each tap point of the plurality of tap points comprises a first half and a second half that couple to each other to define a body having an interior, first and second apertures at opposite ends of the body such that a main passage within the interior is coaxial with the first and second apertures, and a third aperture in a tap side of the body that is between the first and second apertures. The distribution cable extends through the main passage of each tap point of the plurality of tap points. Within each tap point of the plurality of tap points, at least one subunit cable of the plurality of subunit cables separates from a remainder of the plurality of subunit cables and extends through the third aperture. Additionally, each tap point of the plurality of tap points is adjustable such that the plurality of tap points can be spaced apart in a second configuration that is different than the first configuration.

In some embodiments, the tap points are adjustable such that a first quantity of the plurality of tap points is changed to a second quantity of the plurality of tap points, wherein the second quantity is different than the first quantity. In some embodiments, each tap point of the plurality of tap points comprises a first half and a second half, wherein the first half and the second half couple to each other in a snap fit configuration to define a main passage and a drop cable passage separated by an interior wall. In some embodiments, each tap point of the plurality of tap points includes a first aperture, a second aperture, and a third aperture wherein the first aperture and the second aperture define the main passage, and wherein the third aperture and the interior wall define the drop cable passage. In some embodiments, the distribution cable assembly further includes a first grommet applied onto edges of the first aperture and a second grommet applied onto edges of the second aperture. In some embodiments, the distribution cable assembly further includes a third grommet applied onto edges of the third aperture. In some embodiments, the distribution cable assembly further includes a boot assembly extending through the third aperture and into the drop cable passage. In an alternate embodiment, each tap point of the plurality of tap points routes a respective subunit cable to form a respective a tap cable, and wherein each tap cable has a respective length. In some embodiments, at least one of the respective lengths of the tap cables are different with respect to the respective length of another tap cable. In some embodiments, the distribution cable assembly further comprises: a pulling grip positioned between the distribution end and the plurality of tap points. In some embodiments, the distribution cable comprises a mesh material having perforations through which at least one subunit cable of the plurality of subunit cables is fed through.

In one embodiment, a tap point assembly is provided. The tap point assembly comprising: a tap point comprising: a first half; a second half coupled to the first half in a snap fit configuration to define an interior of the tap point; a main passage defined by the first half and the second half, wherein the main passage terminates at a first aperture and a second aperture; an interior wall within the interior of the tap point, the interior wall defining a drop cable passage terminating at a third aperture; and a distribution cable seated in the main passage from the first aperture to the second aperture. The distribution cable includes at least one subunit cable within an interior of the distribution cable. A tap cable exits the third aperture of the tap point, wherein the tap cable is formed by a subunit cable of the at least one subunit cable that is extracted from the distribution cable and seated within the drop cable passage.

In some embodiments, wherein the tap point assembly is movable along a longitudinal axis of the distribution cable. In some embodiments, the distribution cable comprises a mesh material and having a perforation through which the subunit cable that forms the tap cable is extracted. In some embodiments, the tap point assembly further includes a first grommet applied onto edges of the first aperture and a second grommet applied onto edges of the second aperture. In some embodiments, the tap point assembly further includes a third grommet applied onto edges of the third aperture. In some embodiments, the distribution cable assembly further includes a boot assembly extending through the third aperture and into the drop cable passage. In some embodiments, the drop cable passage includes a wall with a recess, and wherein the wall is substantially perpendicular to the interior wall. In some embodiments, the recess of the wall is configured to hold a portion of the boot assembly.

In one embodiment, a method of assembling a distribution cable assembly is provided. The method comprises: inserting a distribution cable into a first half of a tap point, wherein the distribution cable is seated in a portion of a main passage; removing a subunit cable from the distribution cable; feeding the extracted subunit cable into a portion of a drop cable passage; and coupling a second half of the tap point onto the first half of the tap point in a snap fit configuration.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 9A-9C are schematic illustrations of distribution cables in accordance with the present disclosure.

DETAILED DESCRIPTION

Various embodiments will be further clarified by examples in the description below. In general, the description relates to a distribution cable assembly that has various features to enable flexible configurations to accommodate various data center configurations.

Figure 1:
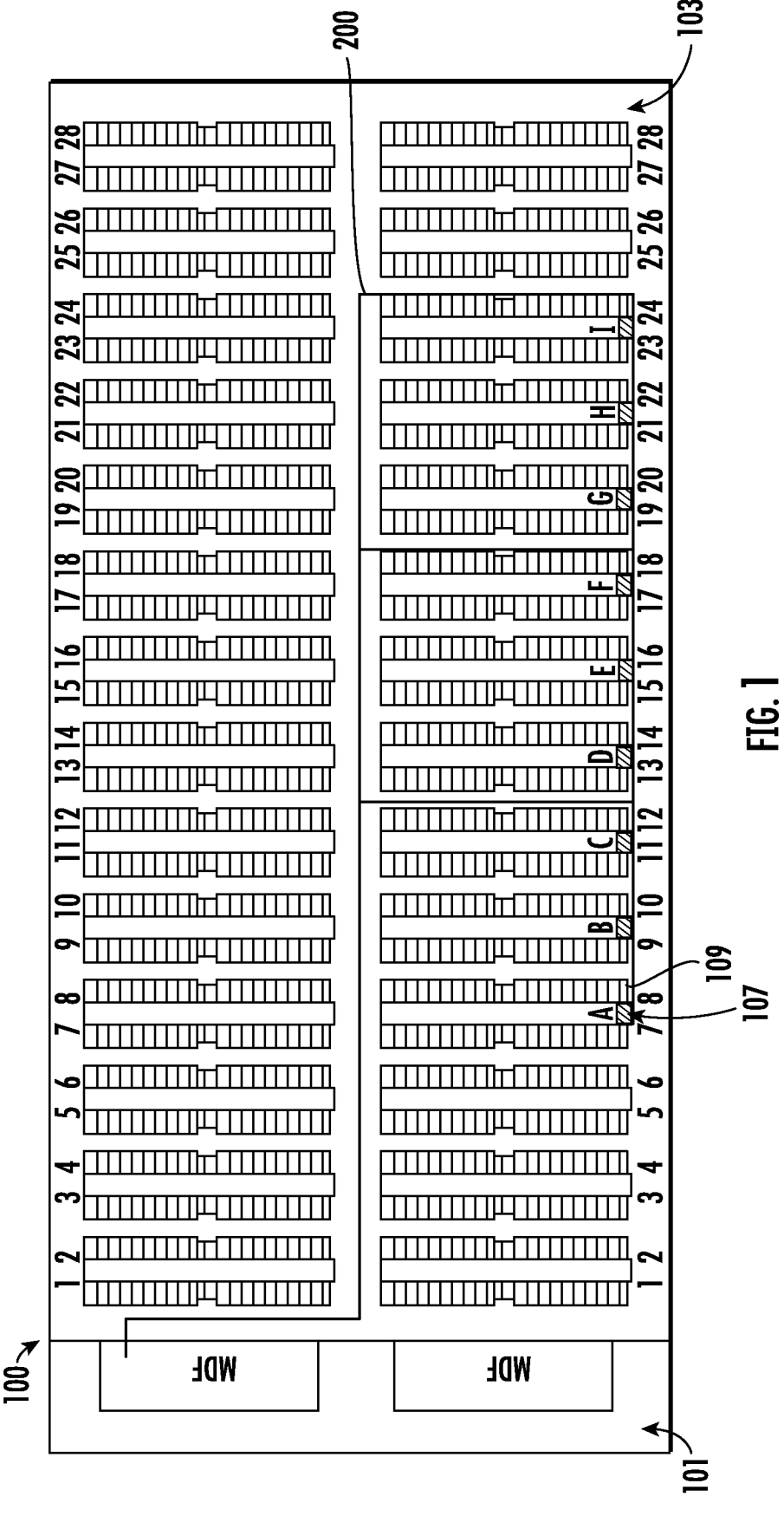
FIG. 1 is a schematic of a data center.

Referring first to FIG. 1, a schematic of a data center 100 is shown. As shown, data center 100 includes a distribution frame region 101 and a cage region 103. Distribution frame region 101 includes a main distribution frame 105 that is connected to cage region 103 as discussed herein. In particular, as shown in FIG. 1, a main distribution frame (MDF)

105 is connected to an intermediate distribution frame (IDF) 107. Intermediate distribution frames are connected to individual cabinets or servers 109 in one or more nearby rows of equipment racks within cage region 103.

Figure 2:
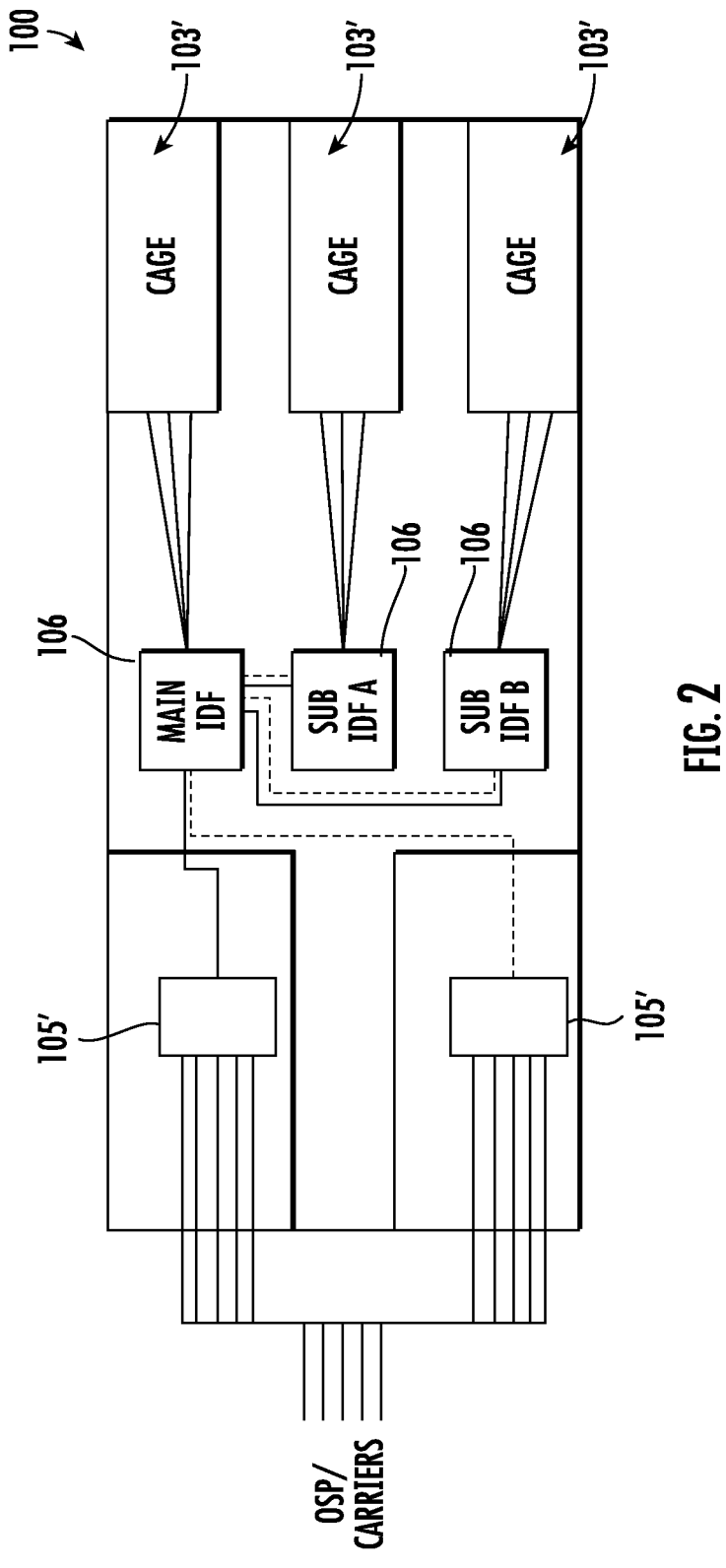
FIG. 2 is a schematic of an alternate embodiment of the data center of FIG. 1.

Referring now to FIG. 2, an alternate configuration of a data center 100' is shown. Data center 100' includes distribution frame regions 101' that each include main distribution frames 105' that are separated from each other and from cage region 103'. As shown, main distribution frames 105' are connected to information distribution frames 106, each of which are connected to each other and corresponding cage regions 103'.

To connect the above-mentioned units to each other, distribution cables are used throughout data center 100, 100'.

Figure 3A:
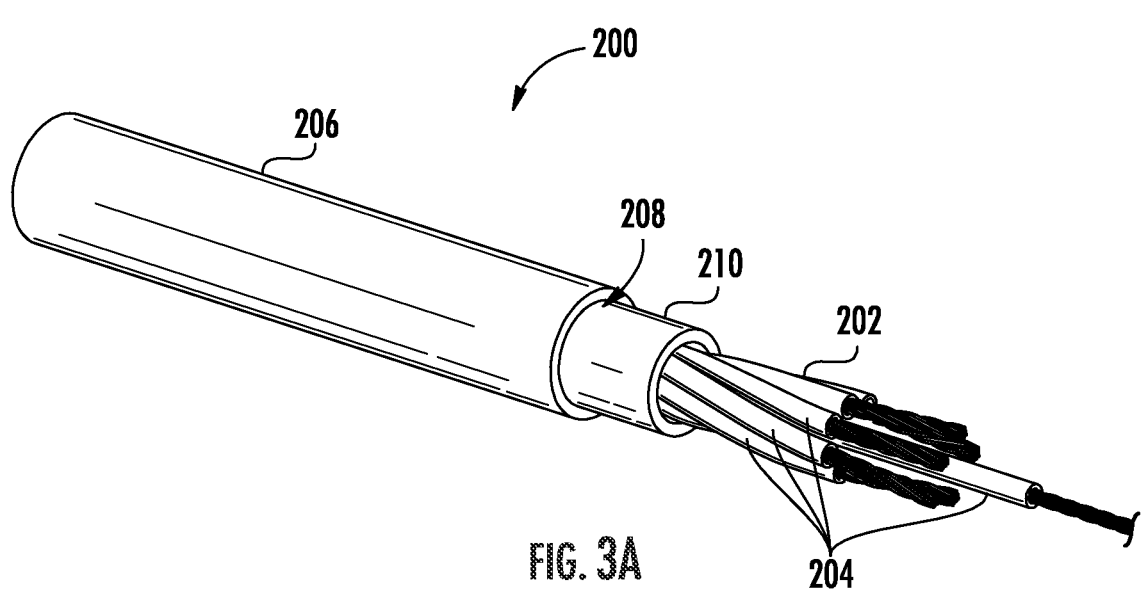
FIG. 3A is a perspective view of a section of fiber optic distribution cable, in accordance with aspects of the present disclosure.
Figure 3B:
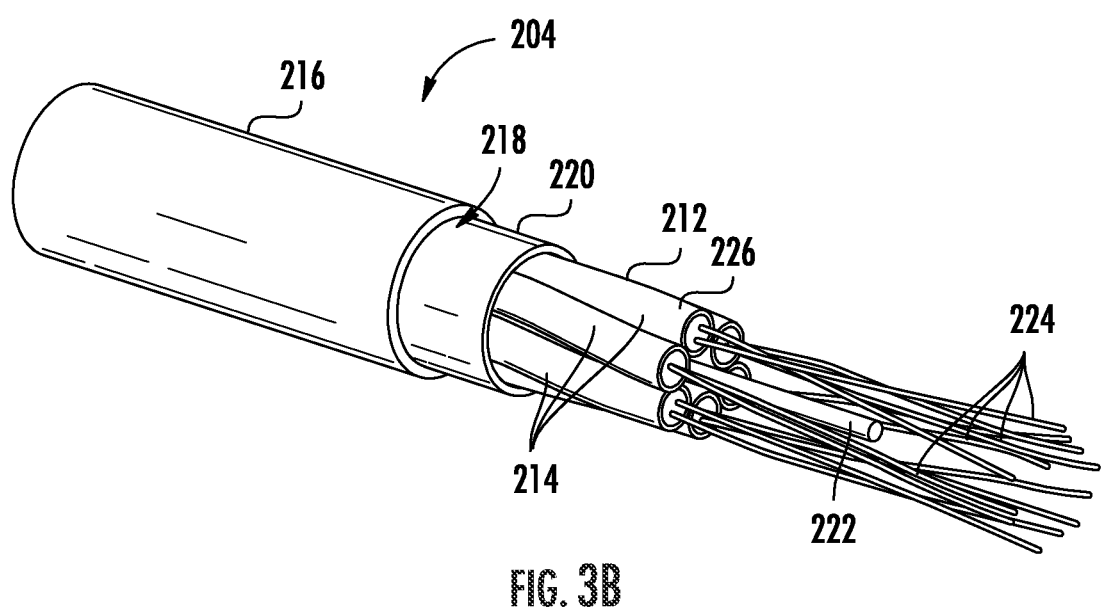
FIG. 3B is a perspective view of a section of a subunit cable of the distribution cable of FIG. 3A, in accordance with aspects of the present disclosure.

FIGS. 3A-3B are views of a section of an example distribution cable 200, in accordance with aspects of the present disclosure. Referring to FIG. 3A, the distribution cable 200 includes a cable bundle 202 (may also be referred to herein as a cable core) of a plurality of subunit cables 204 and a distribution jacket 206 (may also be referred to as outerjacket, subunitjacket, etc.) defining a distribution interior 208. The cable bundle 202 of the subunit cables 204 is disposed in the distribution interior 208 of the distribution jacket 206.

In certain embodiments, a strain-relief component 210 may be disposed within the distribution interior 208 of the distribution jacket 206 between the cable bundle 202 of the subunit cables 204 and the distribution jacket 206. The strain-relief component 210 surrounds and/or is interspersed among the cable bundle 202 of the subunit cables 204.

In certain embodiments, an outer layer of a plurality of subunit cables 204 is stranded around an inner layer of subunit cables 204 to provide higher fiber densities. This reduces any stress or strain concentrations on any single subunit cable 204 (e.g., from bending of the distribution cable 200). In certain embodiments, a central strength element (not shown) may be provided, and the subunit cables 204 may be stranded around the central strength element. In yet other cable applications, stranding may not be used and the subunit cables 204 may run substantially parallel through the distribution cable 200.

Referring to FIG. 3B, each subunit cable 204 (may also be referred to herein as a micro module, etc.) includes a subunit bundle 212 (may also be referred to herein as a subunit core) of a plurality of tether cables 214 (may also be referred to herein as tether subunits) and a subunit jacket 216 defining a subunit interior 218. The subunit bundle 212 of the tether cable 214 is disposed in the subunit interior 218 of the subunit jacket 216.

In certain embodiments, a strain-relief component 220 may be disposed within the subunit interior 218 of the subunit jacket 216 between the subunit bundle 212 of the tether cables 214 and the subunit jacket 216. The strain-relief component 220 surrounds and/or is interspersed among the subunit bundle 212 of the subunit cables 204. In certain embodiments, the strain-relief component 220 may be, for example, a layer of longitudinally-extending yarns for absorbing tensile loads on the subunit bundle 212. In certain embodiments, the strain-relief component 220 includes a dispersed layer of aramid strands in the region between the subunitjacket 216 and the subunit bundle 212 of tether cables 214.

In certain embodiments, a central strength element 222 may be disposed in a center of the subunit bundle 212, and thereby, within the subunit interior 218 of the subunit jacket 216. The tether cables 214 may be stranded (e.g., helically twisted) around the central strength element 222. In certain embodiments, an outer layer of a plurality of tether cables 214 is stranded around an inner layer of tether cables 214 to provide higher fiber densities. In yet other cable applications, stranding may not be used and the tether cables 214 may run substantially parallel through the subunit cable 204. The central strength element 222 provides strain-relief and absorbs loads from the tether cables 214.

In certain embodiments, as illustrated, the subunit bundle 212 is stranded such that the tether cables 214 are helically twisted around a longitudinal axis of the subunit bundle 212. This reduces any stress or strain concentrations on any one tether cable 214 (e.g., from bending of the distribution cable 200 and/or subunit cable 204). Each tether cable 214 includes one or more optical fibers 224 (may also be referred to herein as optical fiber waveguides).

In certain embodiments, the strain-relief component 210 and/or strain-relief component 220 may utilize tensile yarns as tension relief elements that provide tensile strength to the cables 200, 204, 214. In certain embodiments, a preferred material for the tensile yarns is aramid (e.g., KEVLAR®), but other tensile strength materials could be used, such as high molecular weight polyethylenes (e.g., SPECTRA® fiber and DYNEEMA® fiber, Teijin Twaron® aramids, fiberglass, etc.).

Figure 3C:
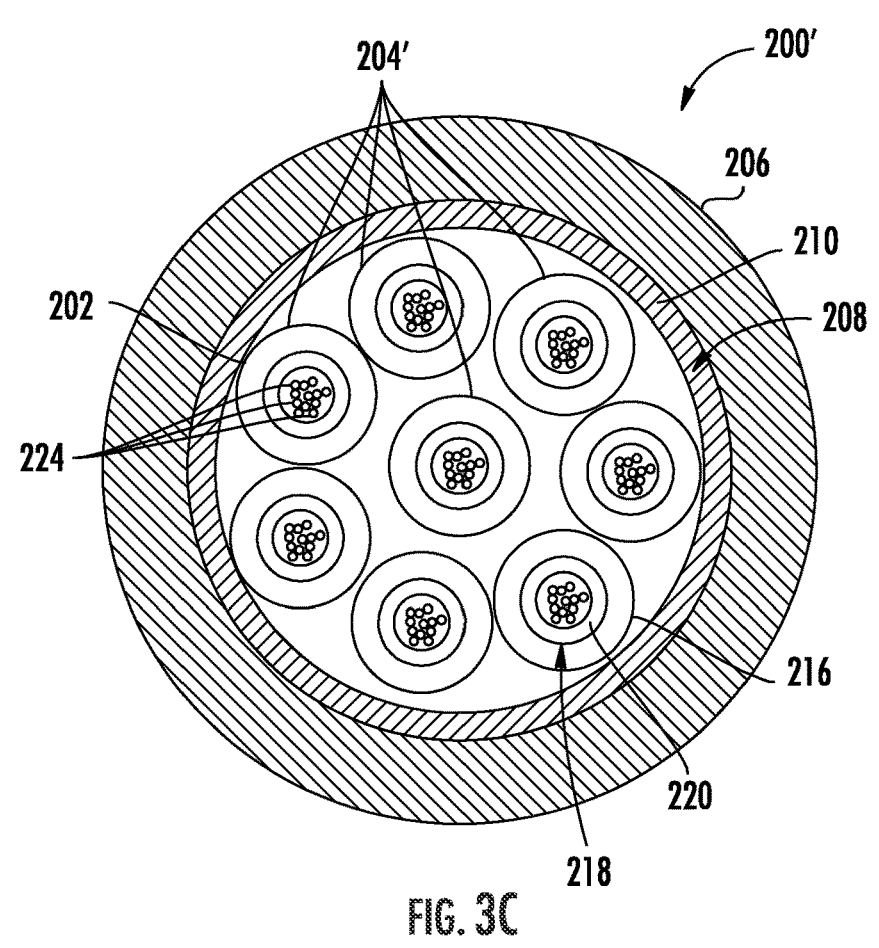
FIG. 3C is a cross-sectional view of an embodiment of the distribution cable of FIGS. 3A-3B, in accordance with aspects of the present disclosure.
Figure 3D:
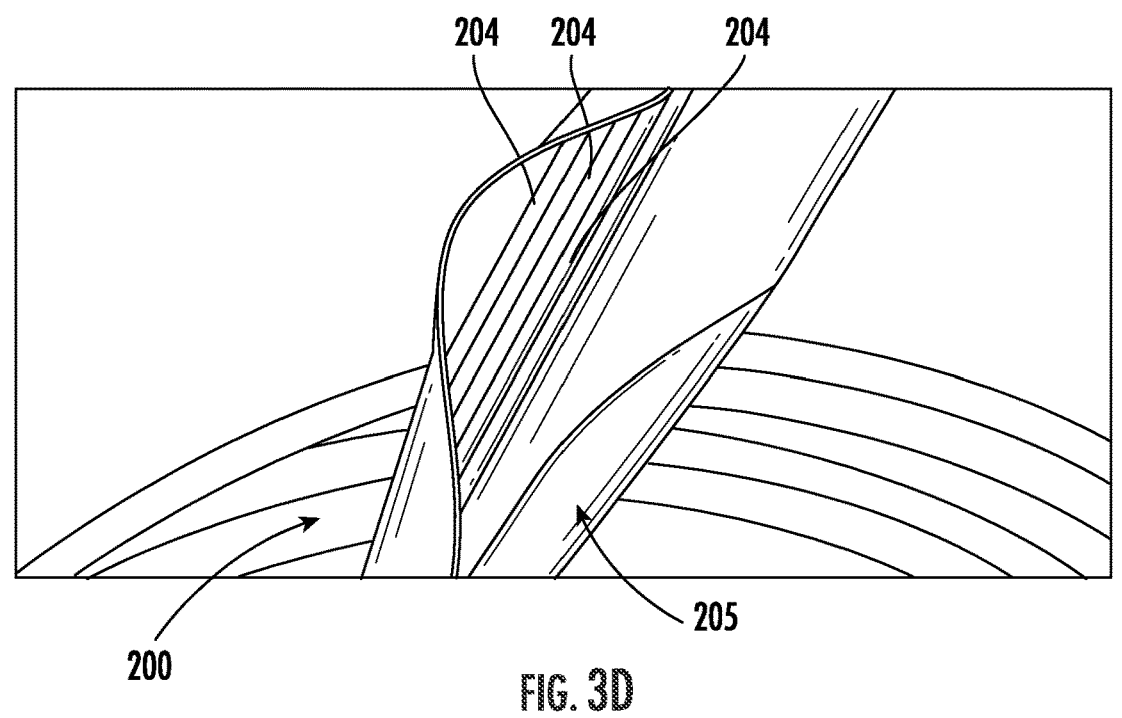
FIG. 3D is a perspective view of a distribution cable and interior subunit cables in accordance with the present disclosure.

Referring briefly to FIG. 3D, an embodiment of distribution cable 200 is shown in accordance with aspects of the present disclosure. As shown in FIG. 3D, distribution cable 200 includes a distribution jacket 206 that defines distribution interior 208 in which a cable bundle 202 of a plurality of subunit cables 204 are housed. Also, as shown, distribution cable 200 does not include strain relief component 210 thereby allowing direct access to the plurality of subunit cables 204 beneath distribution jacket 206 as discussed below. Distribution cable 200 is made of a mesh material that is wrapped around plurality of subunit cables 204. Advantageously, the mesh material of distribution cable 200 provides flexibility to distribution cable 200 such that distribution cable 200 can accommodate different numbers of subunit cables depending on application and cabling requirements. Additionally, distribution cable 200 has a perforation 205 upon which distribution cable 200 can be opened as shown in FIG. 3D to access subunit cables 204 and to route one of subunit cables 204 within tap point 320 (FIG. 6C) as discussed below. Moreover, the mesh material of distribution cable 200 can be various colors, which can assist in field installation. For example, different colors could identify different information distribution frames 107 or cabinets 109 to which distribution cable 200 is associated.

FIG. 3C is a cross-sectional view of an embodiment of a distribution cable 200' of FIGS. 3A-3B, in accordance with aspects of the present disclosure. Each of the subunit cables 204' includes optical fibers 224 loosely disposed within the subunit cable 204' (e.g., in an essentially parallel array). The subunit cable 204' may be further encased in an interlocking armor for enhanced crush resistance.

Figure 4:
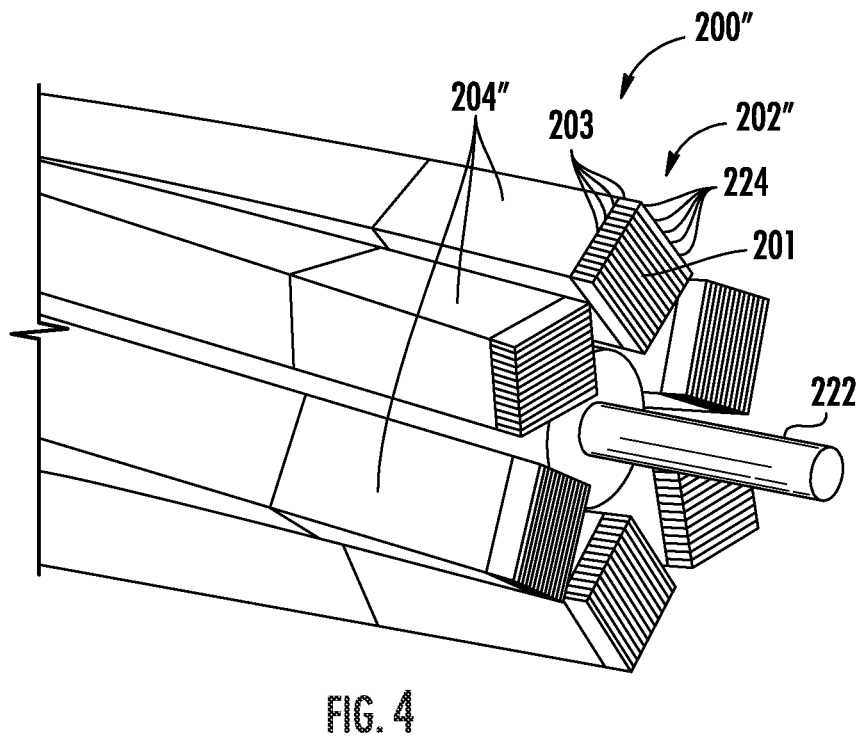
FIG. 4 is a cross-sectional view of another embodiment of the distribution cable of FIGS. 3A-3B, in accordance with aspects of the present disclosure.

FIG. 4 is a cross-sectional view of another embodiment of a distribution cable 200". Each of the subunit cables 204" of the cable bundle 202" is a stack 201 of fiber ribbons 203. Each fiber ribbon 203 includes a plurality of optical fibers 224.

Figure 5A:
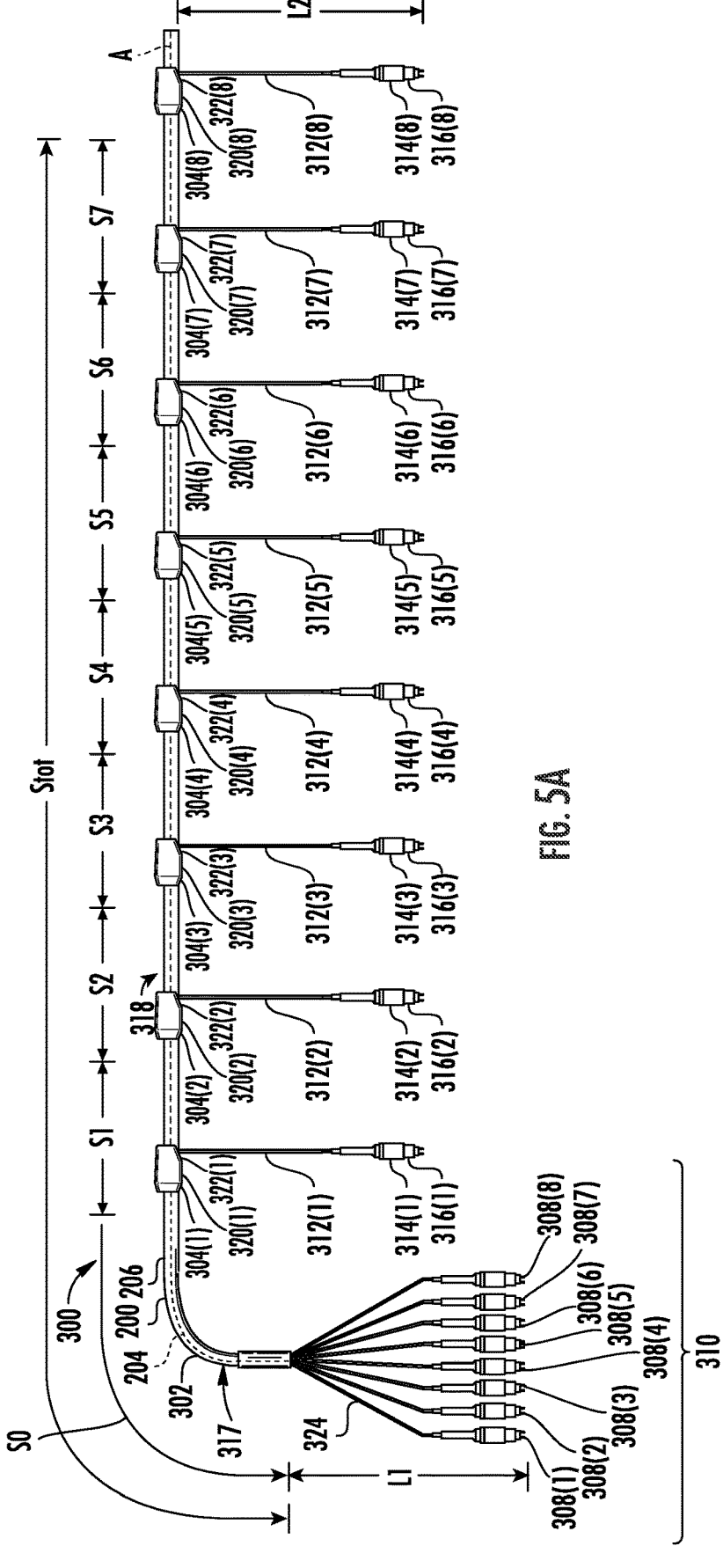
FIG. 5A is a schematic view of an embodiment of a preconnectorized distribution cable assembly, including the distribution cable of FIGS. 3A-4B and illustrating a distribution tether with MPO connectors and eight subunit cables with MPO connectors.
Figure 5B:
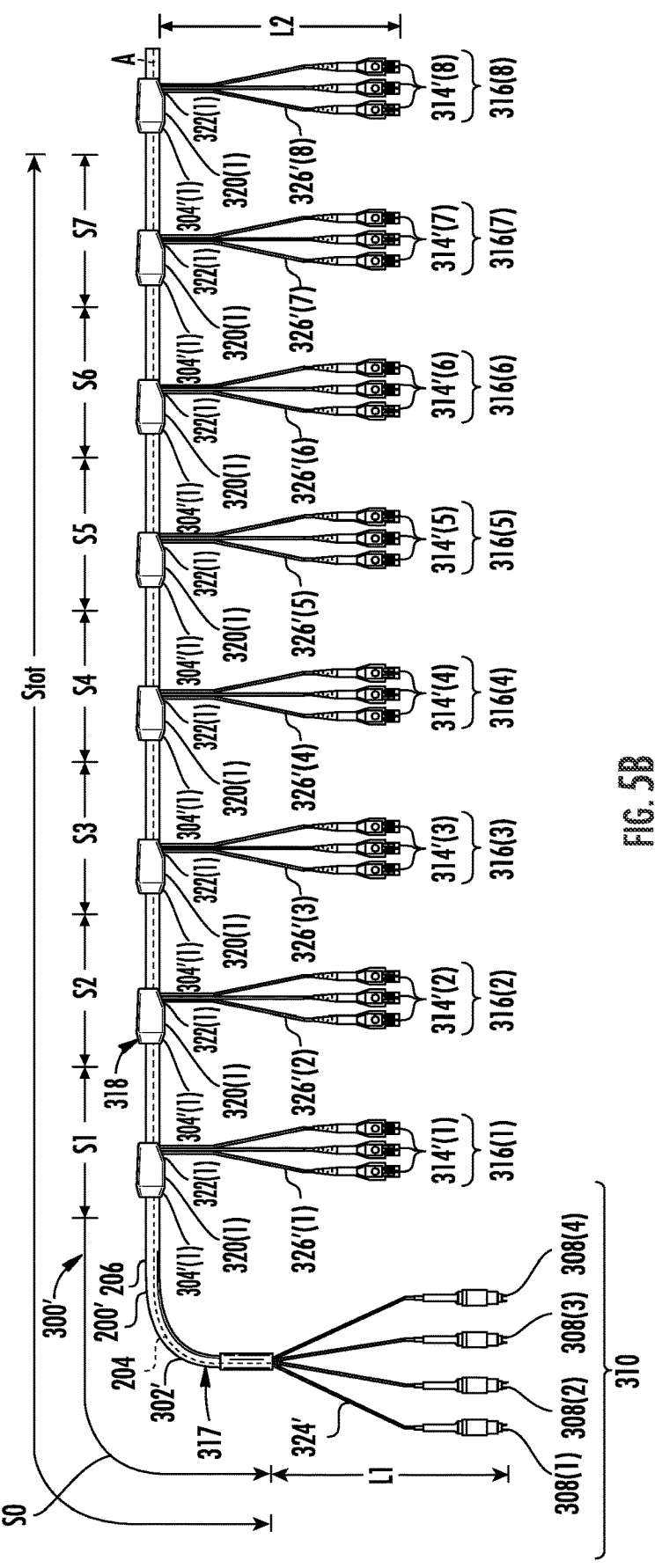
FIG. 5B is a schematic view of another embodiment of a preconnectorized distribution cable assembly, including the distribution cable of FIGS. 3A-4 and illustrating a distribution tether with MTP connectors and eight tether subunits with LC uniboot connectors.
Figure 5C:
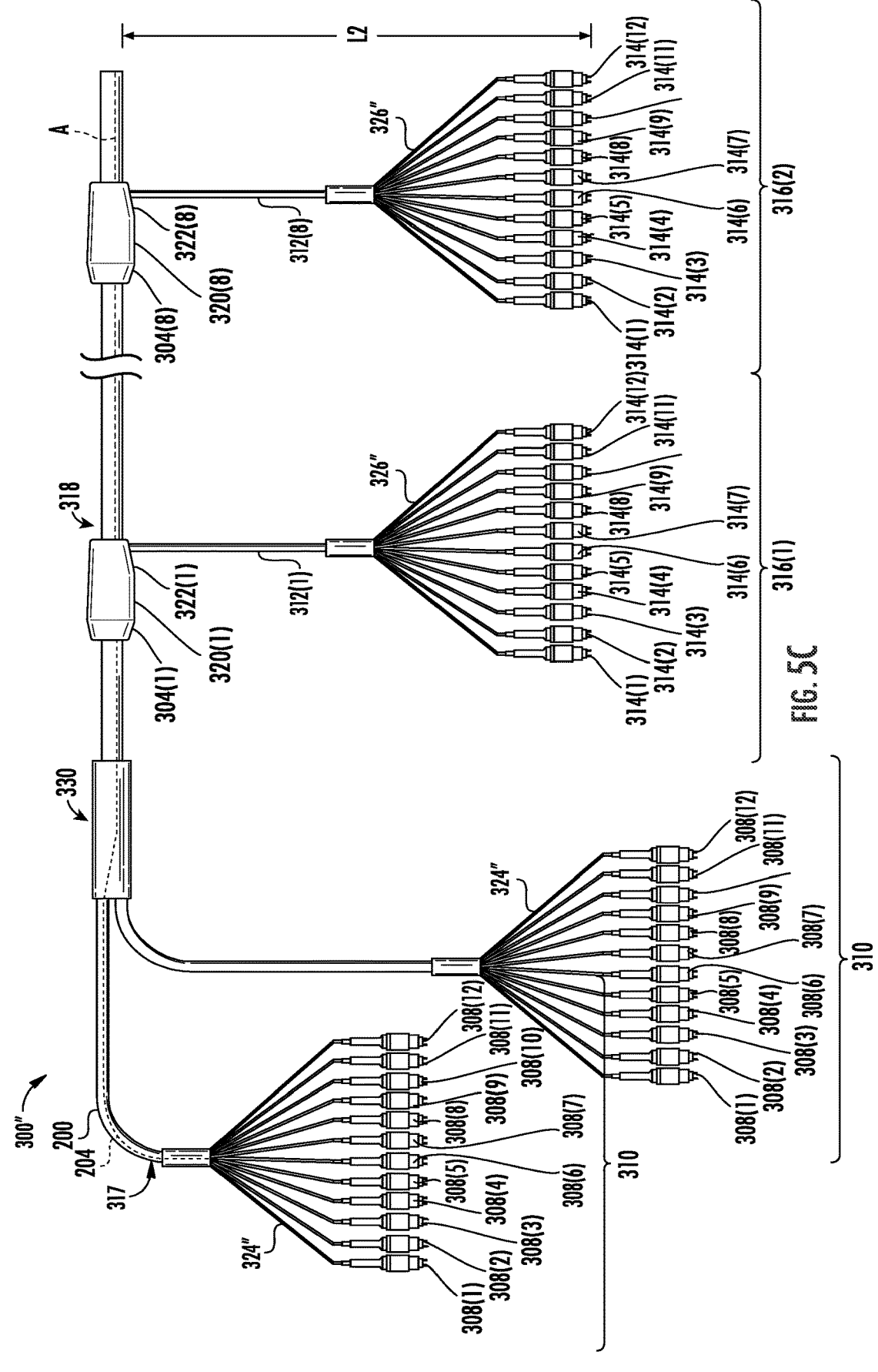
FIG. 5C is a schematic view of another embodiment of a preconnectorized distribution cable assembly, including the distribution cable of FIGS. 3A-4B and illustrating multiple distribution tethers and multiple tap tethers.

FIGS. 5A-5C are embodiments of a distribution cable assembly 300 incorporating the distribution cable of FIGS. 3A-3D. Referring to FIG. 5A, the distribution cable assembly 300 includes a distribution subunit/portion 302 (may also be referred to herein as a main subassembly) and a plurality of tap subunits 304(1)-304(8) (may also be referred to herein as a branch subassembly, drop subunit, etc.). The distribution subunit 302 includes a distribution cable 200 (may be referred to as a distribution cable portion or main cable portion) and distribution connectors 308 at a distribution end 310 (may also be referred to herein as upstream end). Each of the plurality of tap subunits 304(1)-304(8) includes a tap cable 312(1)-312(8) (may also be referred to herein as a drop cable or tap cable portion) and tap connectors 314(1)-314(8) at a tap end 316(1)-316(8) (may also be referred to herein as downstream end). In certain embodiments, subunit cables 204 extend from the distribution connector 308 to respectively one of the plurality of tap connectors 314(1)-314(8), each at a different tap point 320(1)-320(8) (may also be referred to herein as drop point, terminated access point, etc.) along a length of the distribution cable 200. For example, subunit cable 204 extends from the distribution connector 308 through the distribution cable 200 to the tap connector 314(2). The spacing S1-S7 between tap points 320(1)-320(8) depends on the application and cabling requirements and can be adjusted as described below.

Figures 6A, 6B, 6C:
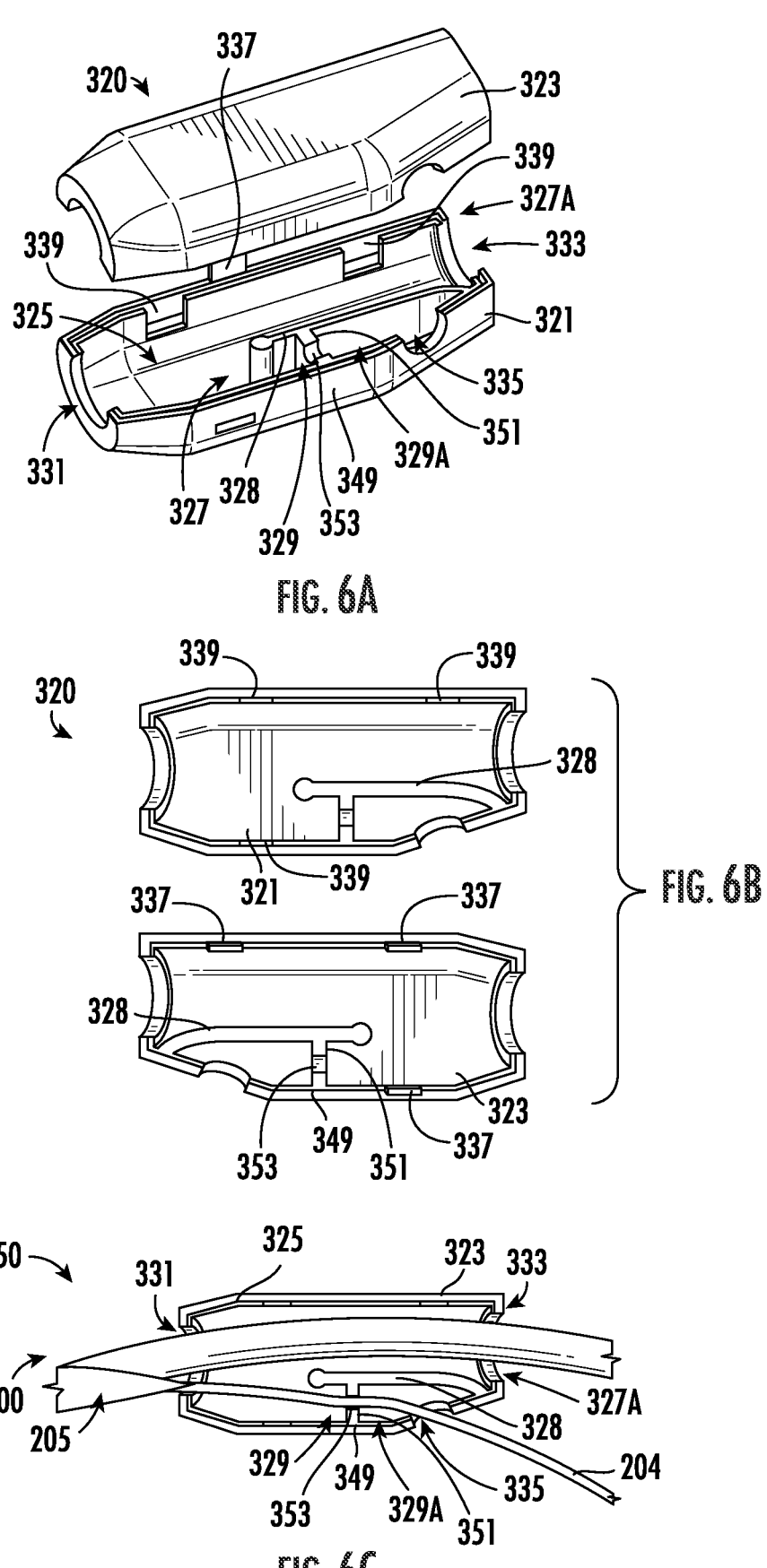
FIG. 6A is an exploded perspective view of a tap point in accordance with the present disclosure.
FIG. 6B is a top view of the tap point of FIG. 6A illustrating an interior of the tap point of FIG. 6A.
FIG. 6C is a top view of a half of a tap point assembly in accordance with the present disclosure.

Referring briefly to FIGS. 6A-6D, a tap point 320 and a tap point assembly 350 respectively are shown. Tap point 320 is configured to route distribution cable 200 through tap point 320 such that a subunit cable 204 can be extracted from distribution cable 200 (through perforation 205) and routed through tap point 320 to form a drop cable or tap cable 312 as shown in FIG. 6C. In other embodiments, more than one subunit cable 204 may be extracted from the distribution cable 200 at each of the tap points 320 (see e.g., FIG. 5B). As shown, tap point 320 comprises a first half 321 and a second half 323 that couple to each other to define a body 322 having an interior 325. As will be apparent, the first half 321 and second half 323 may not have an identical construction. Thus, the term "half" in connection with these elements refers generally to one of two components that couple to each other to define the body 322. The first half 321 and second half 323 may also be referred to as first and second shells or shell components. As shown, the coupling between these components results in the body 322 having a closed arrangement and thereby defining the interior 325.

In some embodiments, first half 321 and second half 323 are coupled to each other by corresponding latch 337 and grooves 339 provided on first half 321 and second half 323 that fit in a snap fit configuration. In other words, the first half 321 includes at least one latch 337, which extends from a side wall of the first half 321, and the second half includes at least one complementary groove 339 configured to be engaged a respective latch 337. The latches 337 and grooves 339 are complementary locking features that provide the snap fit configuration for maintaining the body 320 of the tap point 320 in a closed arrangement. However, it is within the scope of the present disclosure that alternate coupling methods may be used. Advantageously, the snap fit of tap point 320 enables mobility of tap point 320 along a longitudinal axis A of distribution cable 200 which enables flexibility in cable installation onto a server or information data frame in a cage region of a data center. For example, if cabinets 109 are spaced apart a greater distance than anticipated, halves 321, 323 of tap points 320 are decoupled and moved along longitudinal axis A of distribution cable 200 to increase or decrease spacings S1-S7 between tap points 320 such that the spacing between tap points 320 can accommodate the corresponding distance/spacing between cabinets 109 in cage region 103. In some embodiments, spacing S1-S7 ranges between 600 mm and 800 mm. Advantageously, the spacing S1-S7 can be adjusted in accordance to customer requirements such that in some embodiments, spacing S1-S7 can be greater than or equal to 600 mm or less than or equal to 600 mm. In addition, the number of tap points 320 on distribution cable assembly 300 can be adjusted based on the application and cabling requirements. In particular, the snap fit configuration of tap point 320 enables easy addition and removal of tap points along distribution cable 200 to accommodate various data center configurations during installation. In some embodiments, distribution cable assembly 300 has a number of tap points 320 ranging between 1 and 10, or between 6 and 8. Advantageously, similar to spacing S1-S7, the number of tap points 320 can be adjusted in accordance to customer requirements such that in some embodiments, the number of tap points 320 can be outside the stated ranges above.

In some embodiments, tap point 320 is made of a plastic material such as polycarbonate (PC)+acrylonitrile butadiene styrene (ABS) or polyetherimide (e.g., ULTEM®) or polyethersulfone (PESU). However, it is contemplated that in alternate embodiments, alternate materials may be used, such as metal for example.

Interior 325 comprises a main passage 327 and a drop cable passage 329. Main passage 327 is defined between aperture 331 and aperture 333 on opposite ends of tap point 320 and is configured to receive and allow distribution cable 200 to pass through tap point 320. That is, main passage 327 is coaxial with the apertures 331, 333 and has a width that corresponds to a width of distribution cable 200 such that distribution cable 200 can be seated within main passage 327.

As shown in FIG. 6C, tap point assembly 350 comprises tap point 320 where distribution cable 200 is seated within main passage 327, and a subunit cable 204 is extracted from distribution cable 200 (through perforation 205) and inserted into and through drop cable passage 329. Again, in alternate embodiments, more than one subunit cable 204 may be separated (i.e., extracted) from other subunit cables 204 that form part of the distribution cable 200. Additionally, the manner in which the subunit cable(s) 204 separate from the other subunit cables 204 depends on the construction of the distribution cable 200.

Drop cable passage 329 is an off shoot of main passage 327 and is defined by interior wall 328, which in the example embodiment physically separates main passage 327 from drop cable passage 329 and provides structural reinforcement onto tap point 320 and distribution cable 200. Drop cable passage 329 leads to aperture 335 in a side of the body that is between the apertures 331, 331, where tap cable 312 exits tap point 320. Such side may be referred to as a "tap side" of the tap point 320. In some embodiments, as shown, a wall 351 is provided with a recess 353 where wall 351 is substantially perpendicular to interior wall 328, and wall 351 divides drop cable passage 329 into at least a portion 329A as described below. Recess 353 provides a mounting surface for tap cable 312 to rest within drop cable passage 329. In some embodiments, recess 353 provides a mounting surface to which a strain relief structure (e.g., a boot assembly 347, FIG. 7B) can engage as discussed below.

Figures 6D, 7A, 7B, 8:
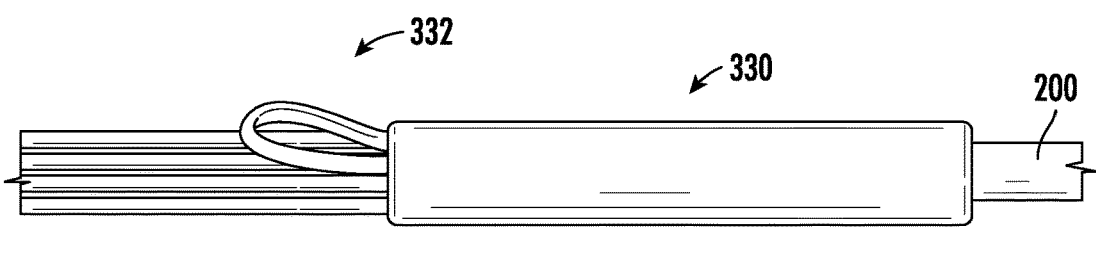
FIG. 6D is a perspective view of the tap point assembly of FIG. 6C as assembled.
FIG. 7A is a perspective view of an alternate embodiment of the tap point assembly of FIG. 6D.
FIG. 7B is a partial exploded view of the tap point assembly of FIG. 7A.
FIG. 8 is a perspective view of a pulling grip in accordance with the present disclosure.

Referring now to FIGS. 7A and 7B, in some embodiments, tap point 320 includes grommets 341, 343, and 345 coupled to apertures 331, 333, and 335 respectively to provide strain relief onto both distribution cable 200 and corresponding tap cable 312. Similarly, in an alternate embodiment, as shown in FIGS. 8A and 8B, tap point 320 includes grommets 341, 343 on apertures 331, 333, respectively to provide strain relief onto distribution cable 200. However, as shown, subunit cable 204 and tap cable 312 are provided with a boot assembly 347 that inserts through aperture 335 and into drop cable passage 329. As shown, boot assembly 347 extends into drop cable passage 329 and engages with the mounting surface provided by recess 353 of wall 351 thereby holding tap cable 312 in place with limited mobility. In some embodiments, boot assembly 347 extends into drop cable passage 329 and engages with interior wall 328 and a side wall 349 of tap point 320 to hold tap cable 312 in place with limited mobility. Boot assembly 347 is configured to provide strain relief and improved retention (i.e., improved retention force) onto subunit cable 204 and tap cable 312 exiting tap point 320. In alternate embodiments, a heat shrink material may be used to provide similar strain relief as boot assembly 347. In some embodiments, grommets 341, 343, and 345 are made of silicon rubber or a thermoplastic elastomer.

Referring back to FIG. 5A, distribution connectors 308(1)-308(8) are in optical communication with the tap connectors 314(1)-314(8) (may be referred to generally as tap connectors 314), where the distribution cable assembly 300 is pre-connectorized, such as for connection to a patch panel (e.g., at intermediate distribution frame 105). The distribution cable assembly 300 includes a distribution portion 317 of the subunit cable 204 that extends for a predetermined length S0 from the distribution connectors 308(1)-308(8) through the distribution cable 200 to the first tap portion 318. The distribution cable assembly 300 further includes tap portions 318 of the subunit cable 204 that extend from the distribution cable 200 to the tap connectors 314(1)-314(8). Accordingly, the total length Stot of the distribution cable 200 includes S0-S7.

Figures 10A, 10B:
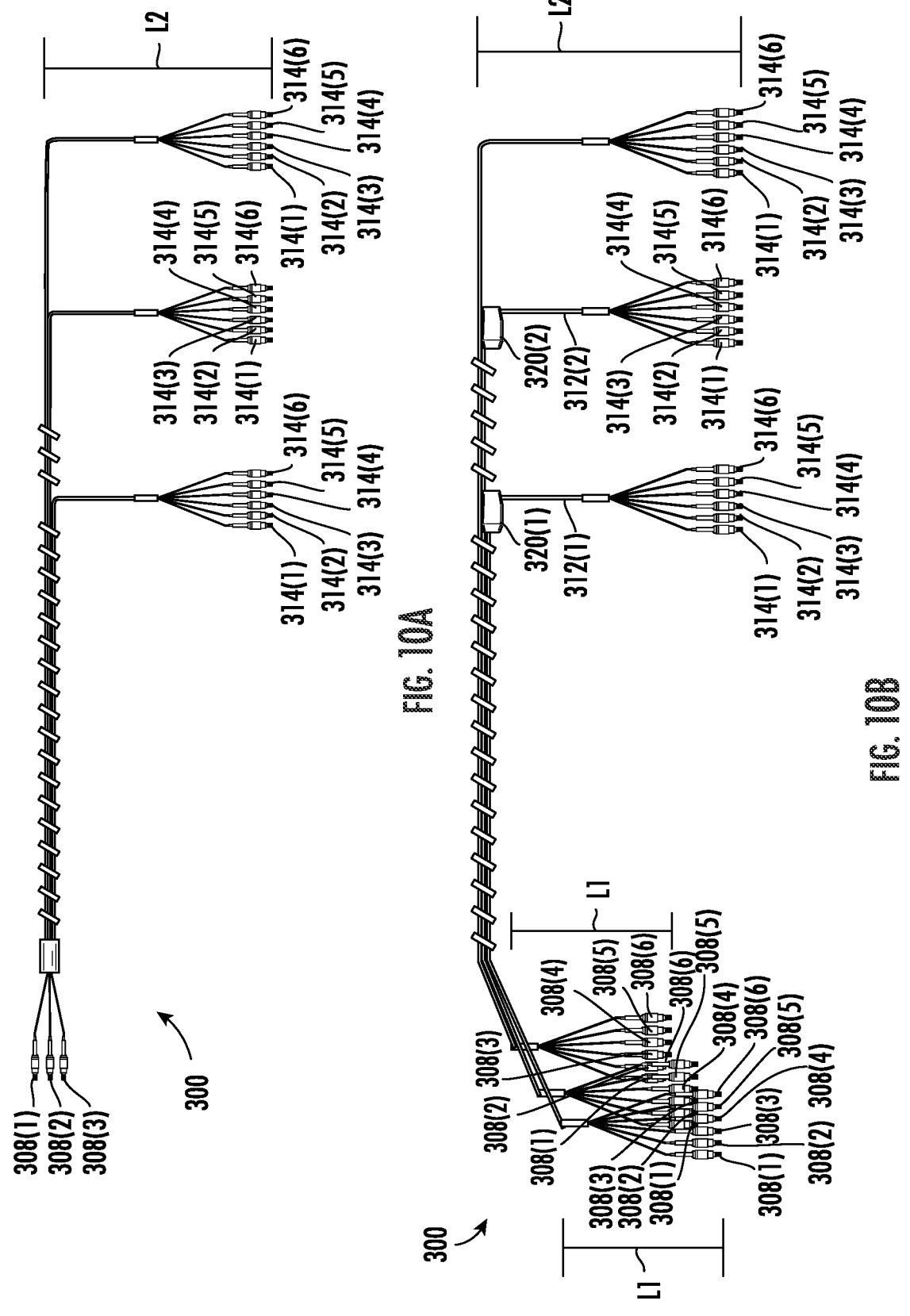
FIGS. 10A-10B are schematic illustrations of distribution cable assemblies in accordance with the present disclosure.

In certain embodiments, as illustrated in FIG. 5A, the distribution subunit 302 includes a distribution tether 324 (may be referred to as a distribution tether portion) at the distribution end 310. In certain embodiments, the distribution cable assembly 300 includes multiple distribution tethers 324 and multiple tap tethers. The distribution tether 324 may be pre-connectorized and extend a predetermined length L1 from an end 325 of the distribution jacket 106. Further, the distribution tether 324 includes distribution connectors 308(1)-308(8) coupled to ends of the distribution tether 324. Similarly, the tap subunits 304(1)-304(8) are pre-connectorized such that the tap cables 312(1)-312(8) extend a predetermined length L2 from the distribution jacket 106. Further, the tap subunits 304(1)-304(8) include tap connectors 314(1)-314(8) coupled to tap ends 316(1)- 316(8) of the tap subunits 304(1)-304(8). In some embodiments, length L1 and length L2 can be the same length. In some embodiments, lengths L2 are the same length among tap connectors 314 as shown in FIGS. 10A and 10B. In alternate embodiments, lengths L1, L2 are different. In some embodiments, lengths L1 among distribution tethers 324 vary as shown in FIGS. 5C and 10B. Stated another way, lengths L1 among tap cables 312(1)-312(8) may vary depending on the application and cabling requirements. In some embodiments, lengths L2 among tap cables 312(1)- 312(8) vary. Stated another way, lengths L2 among tap cables 312(1)-312(8) may vary depending on the application and cabling requirements. For example, length L2 of tap cable 312(1) may be different than length L2 of tap cable 312(2)-312(8). Such variability of lengths L2 enables distribution cable assembly 300 to have flexibility in application depending on the configuration of data center 100, 100'. In some embodiments, length L2 has a length ranging between about 100 mm and about 300 mm. Advantageously, similar to spacing S1-S7 and number of tap points 320, lengths L1 and L2 can be adjusted or modified in accordance to data center 100, 100' construction specifications (i.e., height and size of data centers 100, 100') such that lengths L1 and L2 can be greater than or less than the stated ranges above.

In certain embodiments, as illustrated in FIG. 5B, the distribution cable assembly 300' includes the distribution subunit 302' with a distribution tether 324' at the distribution end 310, which is pre-connectorized. Further, the tap subunits 304'(1)-304'(8) includes tap tethers 326'(1)-326'(8) at the tap ends 316'(1)-316'(8), which is pre-connectorized with tap connectors 314'(1)-314'(8).

FIG. 5C is a schematic view of another embodiment of a preconnectorized distribution cable assembly 300" illustrating multiple distribution tethers 324" and multiple tap tethers 326". Such configurations may be used to increase fiber density and/or for certain routing configurations, such as by routing each distribution tether 324" to each tap tether 326". The distribution connectors 308(1)-308(12) of the distribution tethers 324" are in optical communication with the tap connectors 314(1)-314(2) of the tap tethers 326".

As shown in FIGS. 5A-5C, tap connectors 314, 314' and distribution connectors 308 are shown as MTP® connectors, which are MPO connectors sold by US Conec, Ltd. However, it is within the scope of the present disclosure that alternate connectors may be used, such as SC or LC, for example. In some embodiments, tap connectors 314, 314' and distribution connectors 308 are the same types of connectors as shown in FIGS. 9A and 9C. In some embodiments, tap connectors 314, 314' and distribution connectors 308 are different types of connectors as shown in FIG. 9B. In other embodiments, tap connectors 314, 314' and distribution connectors 308 are each different types of connectors. In another embodiment, individual connectors of tap connectors 314, 314' are different. In another embodiment, individual connectors of distribution connectors 308 are each different types of connectors.

To assemble distribution cable assembly 300, distribution cable 200 is inserted into a half 327A of main passage 327 of first half 321 of tap point 320. Then, a subunit cable 204 housed within distribution cable 200 is extracted through perforation 205 of distribution cable 200, and the extracted subunit cable 204 is fed into a portion 329A of drop cable passage 329. Then, a second half 323 of tap point 320 is coupled to first half 321 of tap point 320 to assemble tap point assembly 350 onto distribution cable assembly 300.

To move distribution cable assembly 300 throughout data center 100, 100', a pulling grip 330 is provided on distribution cable 200 as shown in FIG. 9. In particular, pulling grip 330 is provided between distribution end 310 and tap cables 312, and pulling grip 330 provides a handle 332 onto which a user can grab and apply a pulling force to move distribution cable 300 through data center 100, 100'. In some embodiments, pulling grip 330 is made of a heat shrink material. However, it is within the scope of the present disclosure that pulling grip 330 can be made of other suitable materials such as a hot melt resin resulting from a low pressure molding process, for example. In some embodiments, pulling grip 330 provides a pulling force ranging between about 150 N and 200 N for the heat shrink material or between about 400 N to about 450 N for the low pressure molded hot melt resin.

In some embodiments, the first half 321 and second half 323 may be pivotally coupled together to provide the body 322 with a clamshell configuration. For example, FIGS. 11-13 illustrates an example of a tap point 320' according to an alternative embodiment, with similar reference numbers being used to refer to elements corresponding to those discussed in connection with tap points 320, but with a (')

being added to the reference numbers of the alternative embodiment. As shown in the figures, the first half 321' is pivotally coupled to the second half 323' along top sides thereof. The coupling in the embodiment shown is in the form of a living hinge 400' such that first half 321' and second half 323' are integrally formed together. In alternative embodiments, however, the first half 321' and second half 323' may be separate components that are pivotally coupled together by one or more fasteners. The hinge/pivot coupling between the first half 321' and second half 323' results in the body 322' being configured to move between an open arrangement (e.g., FIGS. 11 and 12) and a closed arrangement (e.g., FIG. 13). In the open arrangement, the tap sides of the first half 321' and second half 323' are not coupled to each other such that the body is open and can receive a distribution cable 200'. In the closed arrangement, the tap sides of the first half 321' and second half 323' are coupled to each other with a snap fit by way of the latches 337' and grooves 339'.

As can be appreciated, the snap fits referred to in this disclosure are removable couplings. That is, the snap fit allows for both coupling and decoupling the first half 321, 321' and the second half 323, 323' from each other to move the body 322, 322' from a closed arrangement back to an open arrangement. In the tap point 320', the first half 321' includes features to facilitate such decoupling. In particular, each of the latches 337' extends from a respective side wall 340' of the body 322', and each of the side walls 340' includes slots 341' adjacent the latches 337'. The slots 341' allow a user to press portions of the side walls 341' that are aligned with the latches 337' (i.e., portions between the slots 341') and thereby cause those portions to flex into the interior 325' of the body 322', away from neighboring portions of the side walls 341'. The latches 337' flex inward together with such portions of the side walls 341'. Thus, when the body 322' has the closed arrangement, the flexing described above can facilitate the latches 337' disengaging the grooves 339' to release the snap fit between the first half 321' and second half 323'.

Figure 12:
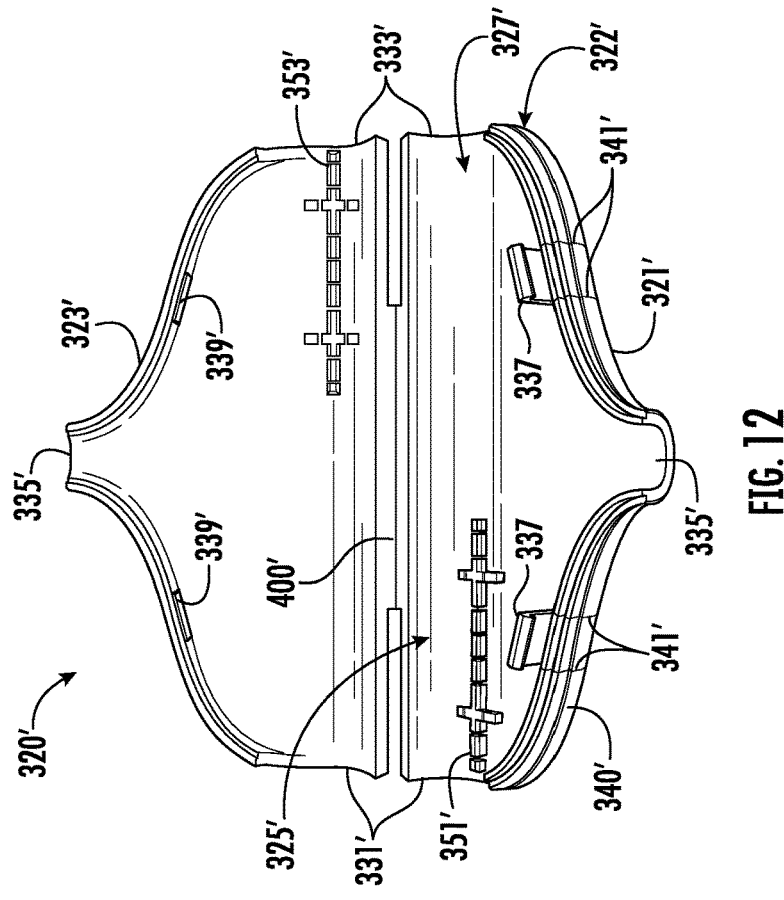
FIGS. 11 and 12 are different perspective views of a tap point according to an alternative embodiment, wherein the tap point is shown in an open configuration.
Figure 11:
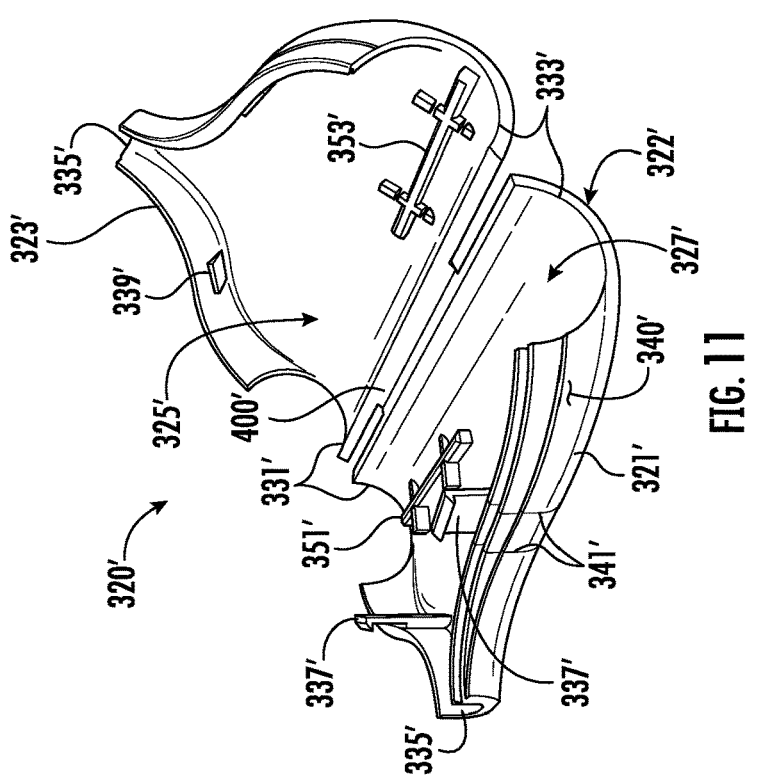
Figure 13:
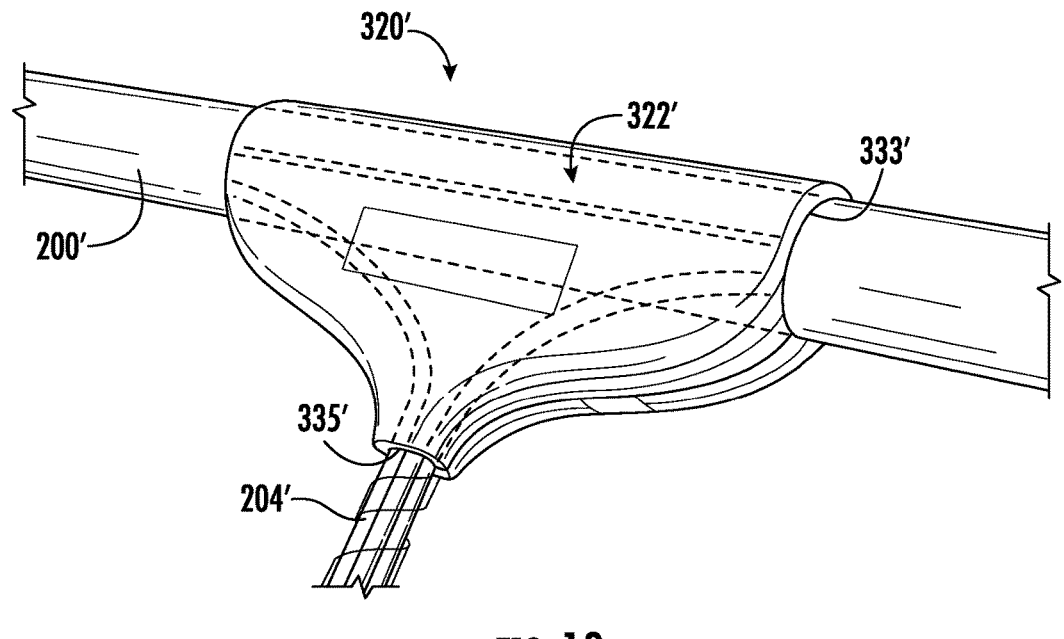
FIG. 13 is a perspective view of the tap point of FIGS. 11 and 12 installed on a fiber optic cable and arranged in a closed configuration.

FIGS. 11 and 12 also illustrate how the tap point 320' may include cable locking features to assist with holding the distribution cable 200', and therefore maintaining the tap point 320' at a desired location along the length of the distribution cable 200'. In particular, FIGS. 11 and 12 illustrate a first cable locking feature 351' projecting from an inner surface of the first half 321' and a second cable locking feature 353' projecting from an inner surface of the second half 323'. The cable locking features 351', 353' project into the main passage 327' to engage the distribution cable 200', as will be described in further detail below. In the embodiment shown, the cable locking features 351', 353' are ribs that extend substantially parallel to the main passage 327'. In alternative embodiments, however, the cable locking features may have a different shape. Additionally, in alternative embodiments there may be more than one cable locking feature on the first half 321' and/or the second half 323', or only one of the first half 321' and second half 323' may include one or more cable locking features.

Figure 14:
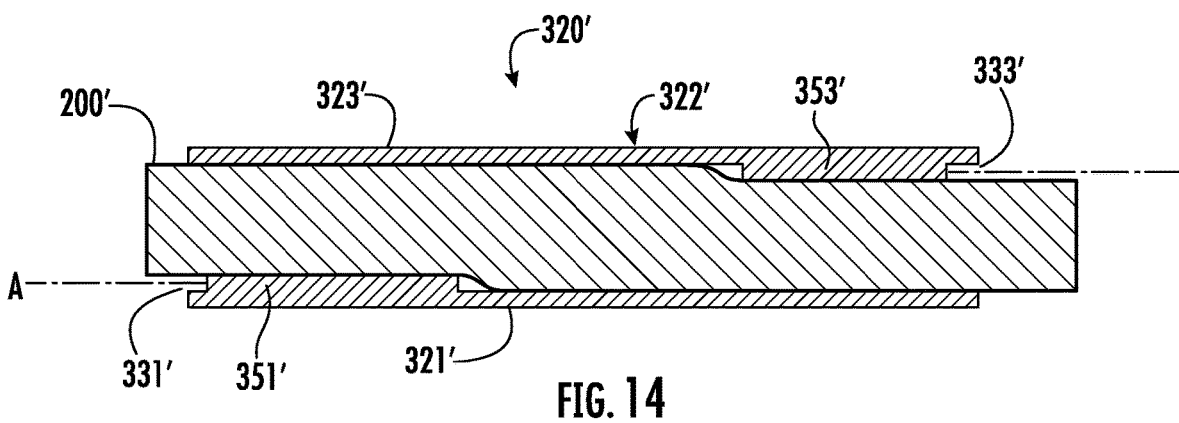
FIG. 14 is a schematic view of the tap point of FIGS. 11 and 12 illustrating how the tap point engages a fiber optic cable.

FIG. 14 schematically illustrates how the cable locking features 351', 353' may be arranged to engage the distribution cable 200' in a particular manner. As shown, the main passage 327' extends along a main axis A between respective centers of the apertures 331', 333'. And with additional reference back to FIG. 12, the figures illustrate how the cable locking feature 351' is positioned between the main axis A and the tap side of the body 322' that includes the aperture 335'. Conversely, the cable locking feature 353' is positioned between the main axis A and the top side of the body 322' (i.e., the side opposite the tap side). Such an arrangement results in the cable locking features 351', 353' engaging the distribution cable 200' in an opposite manner, as shown in FIG. 14, which may result in the body 322' more effectively gripping the distribution cable 200' and remaining in place.

Even though the cable locking features 351', 353' may help retain the tap point 320' at a desired position on the distribution cable 200', it is still possible to decouple the first half 321' and second half 322' in the manner described above. When the body 322' is in the open configuration, the distribution cable 200' is no longer gripped or otherwise engaged by both cable locking features 351', 353'. As a result, the tap point 320' can still be moved relative to the distribution cable 200' to result in a new configuration for the associated distribution cable assembly 300'.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A distribution cable assembly, comprising:
   a distribution cable having a distribution end and a plurality of subunit cables within the distribution cable;
   a plurality of tap points positioned along a length of the distribution cable in a first configuration, wherein:
      each tap point of the plurality of tap points comprises a first half and a second half that couple to each other to define a body having an interior, first and second apertures at opposite ends of the body such that a main passage within the interior is coaxial with the first and second apertures, and a third aperture in a tap side of the body that is between the first and second apertures,
      the distribution cable extends through the main passage of each tap point of the plurality of tap points,
      within each tap point of the plurality of tap points at least one subunit cable of the plurality of subunit cables separates from a remainder of the plurality of subunit cables and extends through the third aperture, and
      each tap point of the plurality of tap points is adjustable such that the plurality of tap points can be spaced apart in a second configuration that is different than the first configuration.

2. The distribution cable assembly of claim 1, wherein for each tap point of the plurality of tap points, the first half and the second half couple to each other in a snap fit configuration.

3. The distribution cable assembly of claim 1, further including a first grommet positioned over edges of the first aperture and a second grommet positioned over edges of the second aperture.

4. The distribution cable assembly of claim 3, further including a third grommet positioned over edges of the third aperture.

5. The distribution cable assembly of claim 1, further including a boot extending through the third aperture.

6. The distribution cable assembly of claim 1, further comprising:
   a pulling grip positioned between the distribution end and the plurality of tap points.

7. The distribution cable assembly of claim 1, wherein the distribution cable comprises a mesh material that surrounds the plurality of subunit cables, and wherein at each tap point of the plurality of tap points the at least one subunit cable that separates from the remainder of the plurality of subunit cables is extracted from the mesh material.

8. The distribution cable assembly of claim 1, wherein for each tap point of the plurality of tap points:

the body further includes an interior wall and a drop cable passage that is separated from the main passage by the interior wall, and the drop cable passage terminates at the third aperature and receives the at least one subunit cable that is extracted from the remainder of the plurality of subunit cables.

9. The distribution cable assembly of claim 1, wherein for each tap point of the plurality of tap points, the body has a clamshell configuration whereby a portion of the first half is pivotally coupled to a portion of the second half such that the body can move from an open arrangement to a closed arrangement, and wherein the a different portion of the first half and different portion of the second half couple to each other with a snap fit in the closed arrangement.

10. The distribution cable assembly of claim 9, wherein for each tap point of the plurality of tap points, the first half of the body is pivotally coupled to the second half of the body by a living hinge.

11. The distribution cable assembly of claim 1, wherein for each tap point of the plurality of tap points, at least one of the first half and the second half includes at least one cable locking feature projecting from an inner surface thereof to engage the distribution cable.

12. The distribution cable assembly of claim 11, wherein for each tap point of the plurality of tap points:

the first half of the body includes a first cable locking feature projecting from the inner surface of the first half; and the second half of the body includes a second cable locking feature projecting from the inner surface of the second half.

13. The distribution cable assembly of claim 12, wherein for each tap point of the plurality of tap points:

the main passage in the interior of the body extends along a main axis between a center of the first aperture and a center of the second aperture;

the first cable locking feature is positioned between the main axis and the tap side of the body that includes the third aperture; and the second cable locking feature is positioned between the main axis and a side of the body that is opposite the tap side.

14. The distribution cable assembly of claim 1, wherein for each tap point of the plurality of tap points, the first half of the body includes at least one locking arm that engages a complementary locking feature on the second half of the body to removably couple the first half and the second half together in a closed arrangement.

15. The distribution cable assembly of claim 14, wherein for each tap point of the plurality of tap points:

each locking arm of the at least one locking arm extends from a side wall of the first half and toward the second half; and for each locking arm of the at least one locking arm, the associated side wall includes slots adjacent the locking arm so that a portion of the side wall that is aligned with the locking arm can flex together with the locking arm away from neighboring portions of the side wall.

* * * * *